US012748640B2

(12) United States Patent
Heling et al.

(10) Patent No.: US 12,748,640 B2
(45) Date of Patent: Sep. 29, 2026

(54) SYSTEMS AND METHODS FOR OPERATIONAL TECHNOLOGY DEVICE AGENT

(71) Applicant: Rockwell Automation Technologies, Inc., Mayfield Heights, OH (US)

(72) Inventors: Joshua R. Heling, Verona, WI (US); Kyle Buzby, Madison, WI (US); Matthew R. Hickok, Viroqua, WI (US); Matthew A. Morrison, Verona, WI (US); Ian Ottoway, Madison, WI (US); Christopher Yungmann, Madison, WI (US); Joseph W. Homp, Verona, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 52 days.

(21) Appl. No.: 18/896,167

(22) Filed: Sep. 25, 2024

(65) Prior Publication Data

US 2026/0086887 A1 Mar. 26, 2026

(51) Int. Cl.
*G06F 9/54* (2006.01)
*H04L 67/12* (2022.01)

(52) U.S. Cl.
CPC .............. *G06F 9/541* (2013.01); *H04L 67/12* (2013.01)

(58) Field of Classification Search
CPC ... H04L 67/56; G06F 8/60; G06F 8/61; G06F 9/445; G06F 9/541
See application file for complete search history.

(56) References Cited

U.S. PATENT DOCUMENTS 10,686,667 B1 6/2020 Subramaniam
11,133,999 B1 * 9/2021 Brosnan .................. H04L 47/36
12,407,760 B1 * 9/2025 Chatterjee ............. H04L 67/141
(Continued)

FOREIGN PATENT DOCUMENTS

EP 4354280 A2 4/2024
WO 2014160816 A2 10/2014
WO 2018199912 A1 11/2018

OTHER PUBLICATIONS

Extended European Search Report for Application No. 25201379.2 mailed Jan. 23, 2026, 12 pages.

*Primary Examiner* — Tonia L Dollinger
*Assistant Examiner* — Linh T. Nguyen
(74) *Attorney, Agent, or Firm* — Fletcher Yoder, P.C.

(57) ABSTRACT

A non-transitory computer readable medium stores instructions that, when executed by processing circuitry, cause the processing circuitry to receive an indication of a host device in an operational technology (OT) network, wherein the host device is communicatively coupled to a target device via the OT network, deploy an endpoint management agent to the host device, identify a driver based on the target device, wherein the driver enables the endpoint management agent to interface with the target device, transmit the driver to the host device, transmit a command to the host device, wherein the command is for the endpoint management agent to perform a task with the target device via the driver, receive, from the host device, data collected during or following performance of the task, and update a record associated with the target device based on the received data.

20 Claims, 6 Drawing Sheets

(56) References Cited

U.S. PATENT DOCUMENTS

| | | | | |
|---|---|---|---|---|
| 2012/0291023 | A1* | 11/2012 | Lu | G06F 9/4411<br>717/178 |
| 2021/0089526 | A1* | 3/2021 | Nixon | G06F 16/9024 |
| 2022/0083926 | A1* | 3/2022 | Miller | G05B 19/41885 |

* cited by examiner

SYSTEMS AND METHODS FOR OPERATIONAL TECHNOLOGY DEVICE AGENT

BACKGROUND

The present disclosure generally relates to asset management in operational technology (OT) networks.

Asset management in OT environments is tedious, resource intensive, and prone to human error. To determine what assets are on an OT network, a person walks through a facility and physically identifies assets. To identify characteristics of the asset, the person may locate a label on the physical device and read information from the label. To identify other assets on the OT network to which a particular asset is connected, the person physically identifies cables connected to the asset and traces the cables to determine the other assets to which the asset is connected. Some relevant information about the asset, such as information that may change over the life of the asset, may not be listed on the label of the asset. To obtain this information, the person may utilize a user interface of the asset, or some intermediary device, such as a human machine interface (HMI), a mobile device, a tablet, and so forth to physically or wirelessly connect to the asset, or another asset communicatively coupled to the asset, and request or retrieve information about the asset. Once information about the asset has been collected, the information may be provided to a table, a database, a file, etc. via manual entry, importation of a comma separated values (CSV) file, etc. Further, to update an asset (e.g., update firmware/software, install new software, update configuration, update operational state, change operational parameters, update logic, etc.), the person utilizes a user interface of the asset, or some intermediary device to physically or wirelessly connect to the asset, or another asset communicatively coupled to the asset, and then pushes the update to the asset. Accordingly, new techniques for collecting, importing, and maintaining information about assets within an OT environment, and updating assets within the OT environment, are needed.

This section is intended to introduce the reader to aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a non-transitory computer readable medium stores instructions that, when executed by processing circuitry, cause the processing circuitry to receive an indication of a host device in an operational technology (OT) network, wherein the host device is communicatively coupled to a target device via the OT network, deploy an endpoint management agent to the host device, identify a driver based on the target device, wherein the driver enables the endpoint management agent to interface with the target device, transmit the driver to the host device, transmit a command to the host device, wherein the command is for the endpoint management agent to perform a task with the target device via the driver, receive, from the host device, data collected during or following performance of the task, and update a record associated with the target device based on the received data.

In another embodiment, a non-transitory computer readable medium stores instructions that, when executed by processing circuitry, cause the processing circuitry to receive, from a server, code configured to cause the processing circuitry to operate as an endpoint management agent on an operational technology (OT) network, execute the code, receive, from the server, a driver associated with a target device on the OT network wherein the driver enables the endpoint management agent to interface with the target device, execute the driver, receive, from the server, a command to perform a task with the target device via the driver, perform the task via the driver, wherein the task comprises collecting data from the target device, and transmit, to the server, the data collected from the target device during performance of the task.

In a further embodiment, a method includes receiving, at an asset manager application, an indication of a host device in a subnet of an operational technology (OT) network, wherein the host device is communicatively coupled to a target device via the OT network, deploying, via the asset manager application, an endpoint management agent to the host device, identifying, via the asset manager application, a driver based on the target device, wherein the driver enables the endpoint management agent to interface with the target device, transmitting, via the asset manager application, the driver to the host device, transmitting, via the asset manager application, a command to host device, wherein the command is for the endpoint management agent to perform a task with the target device via the driver, performing, via the endpoint management agent, the task using the driver, collecting, via the endpoint management agent, data associated with the performance of the task, transmitting the data associated with the performance of the task from the host device to the asset manager application, and updating, via the asset manager application, a record associated with the target device based on the data.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present embodiments will become better understood when the following detailed description is read with reference to the accompanying drawings in which like characters represent like parts throughout the drawings, wherein.

DETAILED DESCRIPTION

Figure 1:
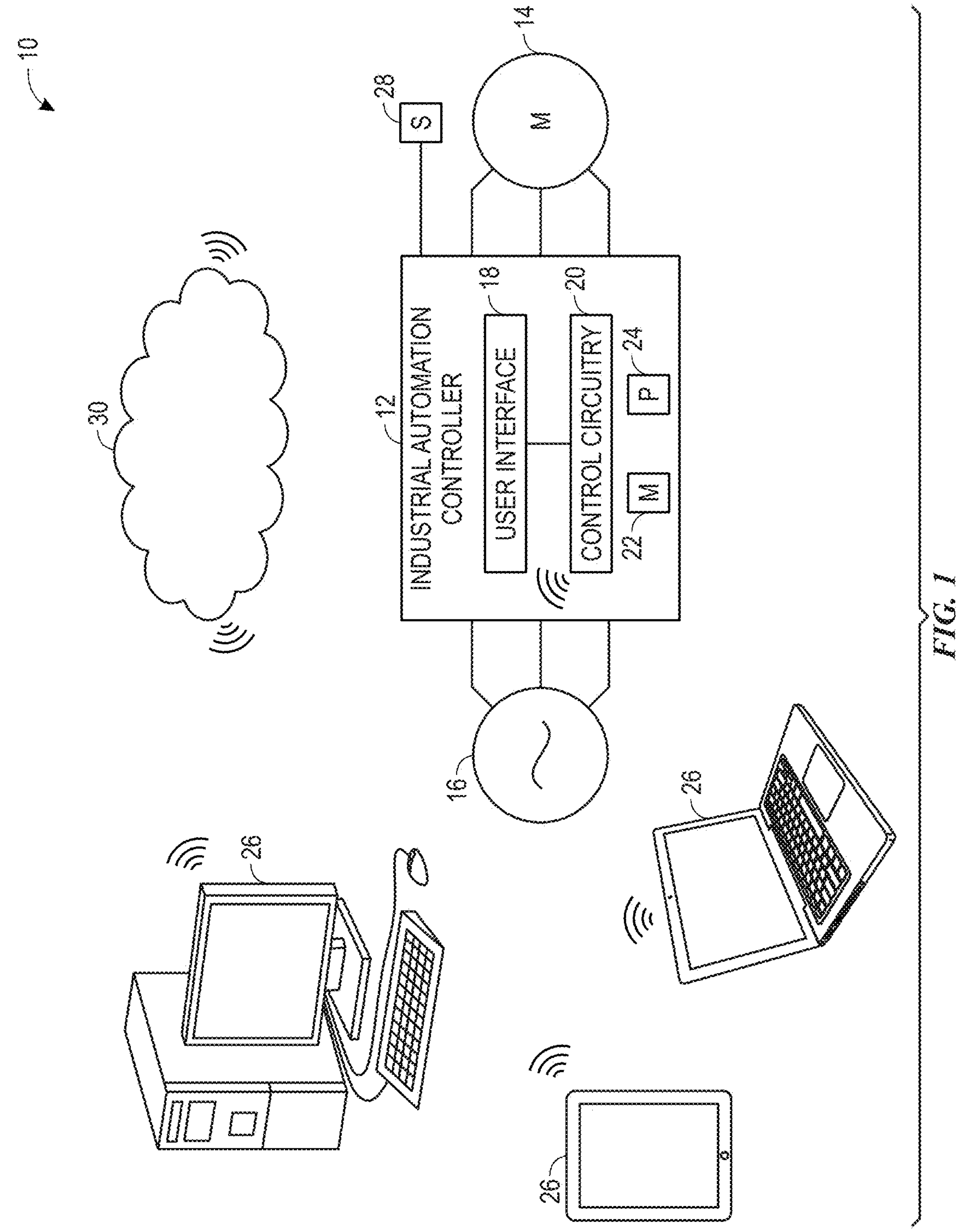
FIG. 1 is a schematic view of an industrial automation system, in accordance with embodiments presented herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Asset management in OT environments is typically tedious, resource intensive, and prone to human error. To determine what assets are on an OT network, a person may walk the facility to physically locate and identify assets. Labels on physical devices may be used to identify some characteristics of the asset. To identify how assets are connected to one another, the person may trace cables between assets. Some relevant information about the asset, such as information that may change over the life of the asset, may not be listed on the label of the asset. To obtain this information, the person may utilize a user interface of the asset, or connect to the asset using some intermediary device, such as a human machine interface (HMI), a mobile device, a tablet, and so forth, or another asset communicatively coupled to the asset, and retrieve information about the asset. Collected information about an asset may be provided to a table, a database, a file, etc. via manual entry, importation of a comma separated values (CSV) file, etc. To update an asset (e.g., update firmware/software, install new software, update configuration, update operational state, change operational parameters, update logic, etc.), the person may utilize a user interface of the asset, or some intermediary device to connect to the asset, or another asset communicatively coupled to the asset, and then push the update to the asset. Accordingly, new techniques for collecting, importing, and maintaining information about assets within an OT environment, and updating assets within the OT environment, are needed.

The present disclosure is directed to a system for performing asset management via an OT device agent. One or more asset manager applications receive or access discovery data regarding assets on an OT network and deploy agents to known host devices within the OT network. The asset manager application maintains a table or database of assets on the OT network, wherein each asset is represented as a record. The asset manager application identifies drivers based on known target devices on the OT network that allow the agents to interface with the target devices. The asset manager application provides the drivers to the agents and then sends commands to perform tasks with the target devices via the drivers. The tasks may include, for example, retrieving/requesting data from target devices, providing a command to the target device to perform some action, updating the firmware of the target device, updating software of the target device, patching the target device, installing new software on the target device, and so forth. Performance of the task may result in data, which is collected by the agent and transmitted to the asset management application. The asset manager application updates the table or database based on the received data. A reporting application, analyzes data stored in the table and/or database maintained by the one or more asset manager applications and generates visualizations accessible via one or more client devices that communicate information about the target devices in the OT network, vulnerabilities experienced by the OT network, risk assessments of the OT network, recommended actions for better securing the OT network, and so forth. Additional details with regard to OT device agents will be provided below with reference to FIGS. 1-7.

By way of introduction, FIG. 1 is a schematic view of an example industrial automation system 10 in which the embodiments described herein may be implemented. As shown, the industrial automation system 10 includes a controller 12 and an actuator 14 (e.g., a motor). The industrial automation system 10 may also include, or be coupled to, a power source 16. The power source 16 may include a generator, an external power grid, a battery, or some other source of power. The controller 12 may be a stand-alone control unit that controls multiple industrial automation components (e.g., a plurality of motors 14), a controller 12 that controls the operation of a single automation component (e.g., motor 14), or a subcomponent within a larger industrial automation system 10. In the instant embodiment, the controller 12 includes a user interface 18, such as a human machine interface (HMI), and control circuitry 20, which may include a memory 22 and a processor 24. The controller 12 may include a cabinet or some other enclosure for housing various components of the industrial automation system 10, such as a motor starter, a disconnect switch, etc.

The control circuitry 20 may be programmed (e.g., via computer readable code or instructions stored on the memory 22, such as a non-transitory computer readable medium, and executable by the processor 24) to provide signals for controlling the actuator 14. In certain embodiments, the control circuitry 20 may be programmed according to a specific configuration desired for a particular application. For example, the control circuitry 20 may be programmed to respond to external inputs, such as reference signals, alarms, command/status signals, etc. The external inputs may originate from one or more relays or other electronic devices. The programming of the control circuitry 20 may be accomplished through software or firmware code that may be loaded onto the internal memory 22 of the control circuitry 20 (e.g., via a locally or remotely located computing device 26) or programmed via the user interface 18 of the controller 12. The control circuitry 20 may respond to a set of operating parameters. The settings of the various operating parameters may determine the operating characteristics of the controller 12. For example, various operating parameters may determine the speed or torque of the motor 14 or may determine how the controller 12 responds to the various external inputs. As such, the operating parameters may be used to map control variables within the controller 12 or to control other devices communicatively coupled to the controller 12. These variables may include, for example, speed presets, feedback types and values, computational gains and variables, algorithm adjustments, status and feedback variables, programmable logic controller (PLC) control programming, and the like.

In some embodiments, the controller 12 may be communicatively coupled to one or more sensors 28 for detecting operating temperatures, voltages, currents, pressures, flow rates, and other measurable variables associated with the industrial automation system 10. With feedback data from the sensors 28, the control circuitry 20 may keep detailed track of the various conditions under which the industrial automation system 10 may be operating. For example, the feedback data may include conditions such as actual motor speed, voltage, frequency, power quality, alarm conditions, etc. In some embodiments, the feedback data may be communicated back to the computing device 26 for additional analysis.

The computing device 26 may be communicatively coupled to the controller 12 via a wired or wireless connection. The computing device 26 may receive inputs from a user defining an industrial automation project using a native application running on the computing device 26 or using a website accessible via a browser application, a software application, or the like. The user may define the industrial automation project by writing code, interacting with a visual programming interface, inputting or selecting values via a graphical user interface, or providing some other inputs. The user may use licensed software and/or subscription services to create, analyze, and otherwise develop the project. The computing device 26 may send a project to the controller 12 for execution. Execution of the industrial automation project causes the controller 12 to control components (e.g., motor 14) within the industrial automation system 10 through performance of one or more tasks and/or processes. In some applications, the controller 12 may be communicatively positioned in a private network and/or behind a firewall, such that the controller 12 does not have communication access outside a local network or subnet and is not in communication with any devices outside the firewall, other than the computing device 26. The controller 12 may collect feedback data during execution of the project, and the feedback data may be provided back to the computing device 26 for analysis. Feedback data may include, for example, one or more execution times, one or more alerts, one or more error messages, one or more alarm conditions, one or more temperatures, one or more pressures, one or more flow rates, one or more motor speeds, one or more voltages, one or more frequencies, and so forth. The project may be updated via the computing device 26 based on the analysis of the feedback data.

The computing device 26 may be communicatively coupled to a cloud server 30 or remote server via the internet, or some other network. In one embodiment, the cloud server 30 may be operated by the manufacturer of the controller 12, a software provider, a seller of the controller 12, a service provider, an operator of the controller 12, an owner of the controller 12, etc. The cloud server 30 may be used to help users create and/or modify projects, to help troubleshoot any problems that may arise with the controller 12, develop policies, or to provide other services (e.g., project analysis, enabling, restricting capabilities of the controller 12, data analysis, controller firmware updates, security, asset management, etc.). The remote/cloud server 30 may be one or more servers operated by the manufacturer, software provider, seller, service provider, operator, or owner of the controller 12. The remote/cloud server 30 may be disposed at a facility owned and/or operated by the manufacturer, software provider, seller, service provider, operator, or owner of the controller 12. In other embodiments, the remote/cloud server 30 may be disposed in a datacenter in which the manufacturer, software provider, seller, service provider, operator, or owner of the controller 12 owns or rents server space. In further embodiments, the remote/cloud server 30 may include multiple servers operating in one or more data center to provide a cloud computing environment.

Figure 2:
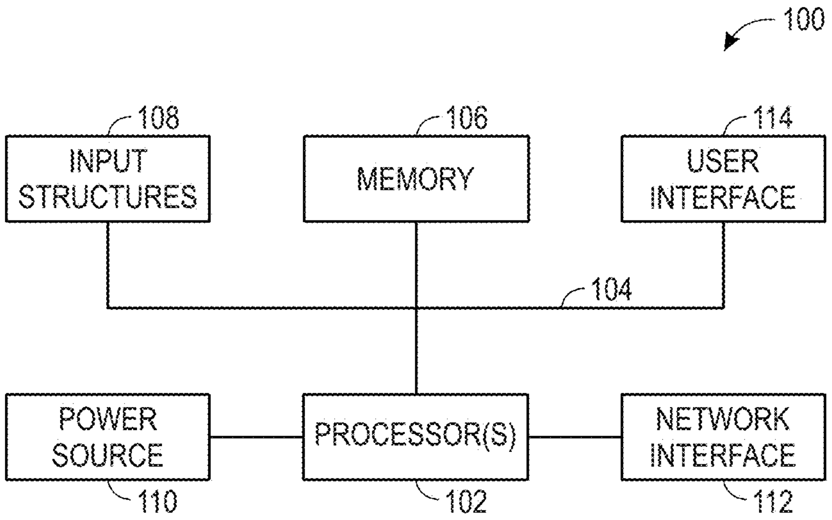
FIG. 2 is a block diagram of example components that could be used in the industrial automation system of FIG. 1, in accordance with embodiments presented herein.

FIG. 2 illustrates a block diagram of example components of a computing device 100 that could be used as the computing device 26, the cloud/remote server 30, the controller 12, or some other device within the system 10 shown in FIG. 1. As used herein, a computing device 100 may be implemented as one or more computing systems including laptop, notebook, desktop, tablet, HMI, or workstation computers, as well as server type devices or portable, communication type devices, such as cellular telephones and/or other suitable computing devices.

As illustrated, the computing device 100 may include various hardware components, such as one or more processors 102, one or more busses 104, memory 106, input structures 108, a power source 110, a network interface 112, a user interface 114, and/or other computer components useful in performing the functions described herein.

The one or more processors 102 (e.g., processing circuitry) may include, in certain implementations, microprocessors configured to execute instructions stored in the memory 106 or other accessible locations. Alternatively, the one or more processors 102 may be implemented as application-specific integrated circuits (ASICs), field-programmable gate arrays (FPGAs), and/or other devices designed to perform functions discussed herein in a dedicated manner. As will be appreciated, multiple processors 102 or processing components may be used to perform functions discussed herein in a distributed or parallel manner.

The memory 106 may encompass any tangible, non-transitory medium for storing data or executable routines. Although shown for convenience as a single block in FIG. 2, the memory 106 may encompass various discrete media in the same or different physical locations. The one or more processors 102 may access data in the memory 106 via one or more busses 104.

The input structures 108 may allow a user to input data and/or commands to the device 100 and may include mice, touchpads, touchscreens, keyboards, controllers, and so forth. The power source 110 can be any suitable source for providing power to the various components of the computing device 100, including line and battery power. In the depicted example, the device 100 includes a network interface 112. Such a network interface 112 may allow communication with other devices on a network using one or more communication protocols. In the depicted example, the device 100 includes a user interface 114, such as a display that may display images or data provided by the one or more processors 102. The user interface 114 may include, for example, a monitor, a display, and so forth. As will be appreciated, in a real-world context a processor-based system, such as the computing device 100 of FIG. 2, may be employed to implement some or all of the present approach, such as performing the functions of the controller, the computing device 26, and/or the cloud/remote server 30 shown in FIG. 1, as well as other memory-containing devices.

Figure 3:
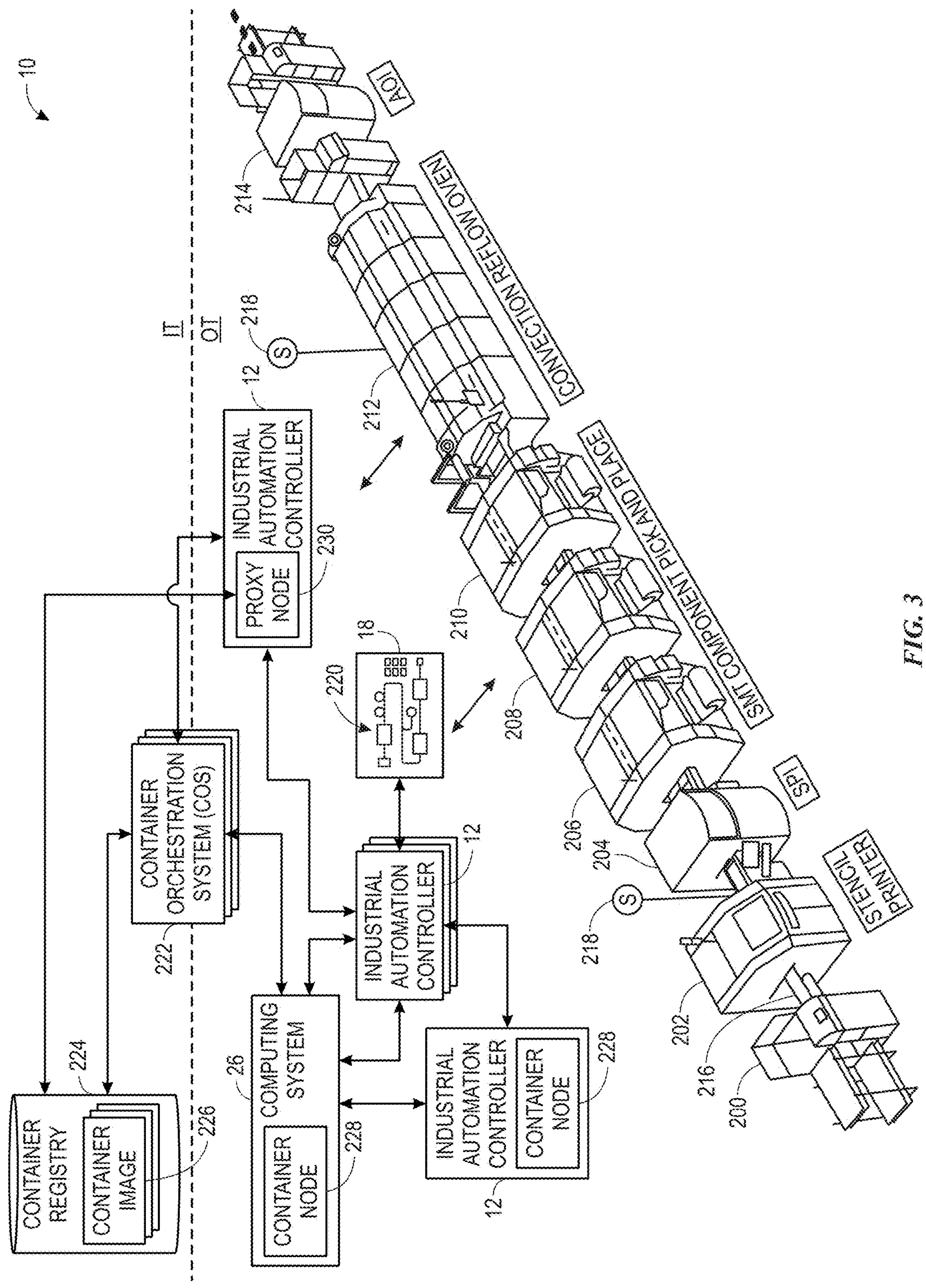
FIG. 3 is a perspective view of an example of the industrial automation system of FIG. 1, controlled by one or more industrial automation controllers, in accordance with an embodiment.

FIG. 3 is a perspective view of an example implementation of the industrial automation system 10 of FIG. 1. The industrial automation system 10 includes stations 200, 202, 204, 206, 208, 210, 212, 214 having machine components and/or machines to conduct functions within an automated process, such as printed circuit board assembly, as is depicted. The automated process may begin at a station 200 used for loading objects, such as substrates, into the industrial automation system 10 via a conveyor section 216. For example, objects may be transported along the conveyor section 216 to station 202 to perform a first action, such a printing solder paste to the substrate via stenciling. As objects exit from the station 202, the objects may be transported via the conveyor section 216 to a station 204 for solder paste inspection (SPI) to inspect printer results, to a station 206, 208, and 210 for surface mount technology (SMT) component placement, to a station 212 for convection reflow oven to melt the solder to make electrical couplings, and finally to a station 214 for automated optical inspection (AOI) to inspect the object manufactured (e.g., the manufactured printed circuit board). After the objects proceed through the various stations, the objects may be removed from the station 214, for example, for storage in a warehouse or for shipment. It should be understood, however, that, for other applications, the particular system, machine components, machines, stations, and/or conveyors may be different or specially adapted to the application.

For example, the industrial automation system 10 may include machinery to perform various operations in a compressor station, an oil refinery, a batch operation for making food items, chemical processing operations, brewery operations, mining operations, a mechanized assembly line, and so forth. Accordingly, the industrial automation system 10 may include a variety of operational components, such as electric motors, valves, pumps, actuators, heaters, chillers, temperature sensing elements, pressure sensors, or a myriad of machinery or devices used for manufacturing, processing, material handling, and other applications. The industrial automation system 10 may also include electrical equipment, hydraulic equipment, compressed air equipment, steam equipment, mechanical tools, protective equipment, refrigeration equipment, power lines, hydraulic lines, steam lines, and the like. Some example types of equipment may include mixers, machine conveyors, tanks, skids, specialized original equipment manufacturer machines, and the like. In addition to the equipment described above, the industrial automation system 10 may also include motors, protection devices, switchgear, compressors, and the like. Each of these described operational components may correspond to and/or generate a variety of OT data regarding operation, status, sensor data, operational modes, alarm conditions, or the like, that may be desirable to output for analysis with IT data from an IT network, for storage in an IT network, for analysis with expected operation set points (e.g., thresholds), or the like.

In certain embodiments, one or more properties of the industrial automation system 10 equipment, such as the stations 200, 202, 204, 206, 208, 210, 212, 214, may be monitored and controlled by one or more industrial automation controllers 12 for regulating control variables. For example, sensing devices (e.g., sensors 218) may monitor various properties of the industrial automation system 10 and may be used by the automation controller(s) 12 at least in part in adjusting operations of the industrial automation system 10 (e.g., as part of a control loop). In some cases, the industrial automation system 10 may be associated with devices used by other equipment. For instance, scanners, gauges, valves, flow meters, and the like may be disposed on or within the industrial automation system 10. Here, the industrial automation controller(s) 12 may receive data from the associated devices and use the data to perform their respective operations more efficiently. For example, an industrial automation controller 12 of the industrial automation system 10 associated with a motor drive may receive data regarding a temperature of a connected motor and may adjust operations of the motor drive based on the data.

The industrial automation controllers 12 may include or be communicatively coupled to the display/operator interface 18 (e.g., a human-machine interface (HMI)) and to devices of the industrial automation system 10. It should be understood that any suitable number of industrial automation controllers 12 may be used in a particular industrial automation system 10 embodiment. The industrial automation controllers 12 may facilitate representing components of the industrial automation system 10 through programming objects that may be instantiated and executed to provide simulated functionality similar or identical to the actual components, as well as visualization of the components, or both, on the display/operator interface 18. The programming objects may include code and/or instructions stored in the industrial automation controllers 12 and executed by processing circuitry of the industrial automation controllers 12. The processing circuitry may communicate with memory circuitry to permit the storage of the component visualizations.

As illustrated, the display/operator interface 18 may be configured to depict representations 220 of the components of the industrial automation system 10. The industrial automation controllers 12 may use data transmitted by the sensors 218 to update visualizations of the components via changing one or more statuses, states, and/or indications of current operations of the components. These sensors 218 may be any suitable device adapted to provide information regarding process conditions. Indeed, the sensors 218 may be used in a process loop (e.g., control loop) that may be monitored and controlled by the industrial automation controllers 12. As such, a process loop may be activated based on process inputs (e.g., an input from the sensor 218) or direct input from a person via the display/operator interface 18. The person operating and/or monitoring the industrial automation system 10 may reference the display/operator interface 18 to determine various statuses, states, and/or current operations of the industrial automation system 10 and/or for a particular component. Furthermore, the person operating and/or monitoring the industrial automation system 10 may adjust to various components to start, stop, power-down, power-on, or otherwise adjust an operation of one or more components of the industrial automation system 10 through interactions with control panels or various input devices.

The industrial automation system 10 may be considered a data-rich environment with several processes and operations that each respectively generate a variety of data. For example, the industrial automation system 10 may be associated with material data (e.g., data corresponding to substrate or raw material properties or characteristics), parametric data (e.g., data corresponding to machine and/or station performance, such as during operation of the industrial automation system 10), test results data (e.g., data corresponding to various quality control tests performed on a final or intermediate product of the industrial automation system 10), or the like, that may be organized and sorted as OT data. In addition, sensors 218 may gather OT data indicative of one or more operations of the industrial automation system 10 or the industrial automation controllers 12. In this way, the OT data may be analog data or digital data indicative of measurements, statuses, alarms, or the like associated with operation of the industrial automation system 10 or the industrial automation controllers 12.

The industrial automation controllers 12 described above may operate in an OT space in which OT data is used to monitor and control OT assets (e.g., OT devices), such as the equipment illustrated in the stations 200, 202, 204, 206, 208, 210, 212, 214 of the industrial automation system 10 or other industrial equipment. The OT space, environment, or network generally includes direct monitoring and control operations that are coordinated by the industrial automation controllers 12 and a corresponding OT asset. For example, a programmable logic controller (PLC) may operate in the OT network to control operations of an OT asset (e.g., drive, motor, and/or high-level controllers). The industrial automation controllers 12 may be specifically programmed or configured to communicate directly with the respective OT assets.

A container orchestration system 222, on the other hand, may operate in an information technology (IT) environment. That is, the container orchestration system 222 may include a cluster of multiple computing devices that coordinates an automatic process of managing or scheduling work of individual containers for applications within the computing devices of the cluster. In other words, the container orchestration system 222 may be used to automate various tasks at scale across multiple computing devices. By way of example, the container orchestration system 222 may automate tasks such as configuring and scheduling deployment of containers, provisioning and deploying containers, determining availability of containers, configuring applications in terms of the containers that they run in, scaling of containers to equally balance application workloads across an infrastructure, allocating resources between containers, performing load balancing, traffic routing, and service discovery of containers, performing health monitoring of containers, securing the interactions between containers, and the like. In any case, the container orchestration system 222 may use configuration files to determine a network protocol to facilitate communication between containers, a storage location to save logs, and the like. The container orchestration system 222 may also schedule deployment of containers into clusters and identify a host (e.g., node) that may be best suited for executing the container. After the host is identified, the container orchestration system 222 may manage the lifecycle of the container based on predetermined specifications.

With the foregoing in mind, it should be noted that containers refer to technology for packaging an application along with its runtime dependencies. That is, containers include applications that are decoupled from an underlying host infrastructure (e.g., operating system). By including the run time dependencies with the container, the container may perform in the same manner regardless of the host in which it is operating. In some embodiments, containers may be stored in a container registry 224 as container images 226. The container registry 224 may be any suitable data storage or database that may be accessible to the container orchestration system 222. The container image 226 may correspond to an executable software package that includes the tools and data employed to execute a respective application. That is, the container image 226 may include related code for operating the application, application libraries, system libraries, runtime tools, default values for various settings, and the like.

By way of example, an integrated development environment (IDE) tool may be employed by a user to create a deployment configuration file that specifies a desired state for the collection of nodes of the container orchestration system 222. The deployment configuration file may be stored in the container registry 224 along with the respective container images 226 associated with the deployment configuration file. The deployment configuration file may include a list of different pods and a number of replicas for each pod that should be operating within the container orchestration system 222 at any given time. Each pod may correspond to a logical unit of an application, which may be associated with one or more containers. The container orchestration system 222 may coordinate the distribution and execution of the pods listed in the deployment configuration file, such that the desired state is continuously met. In some embodiments, the container orchestration system 222 may include a primary node that retrieves the deployment configuration files from the container registry 224, schedules the deployment of pods to the connected nodes, and ensures that the desired state specified in the deployment configuration file is met. For instance, if a pod stops operating on one node, the primary node may receive a notification from the respective secondary node that is no longer executing the pod and deploy the pod to another secondary node to ensure that the desired state is present across the cluster of nodes.

As mentioned above, the container orchestration system 222 may include a cluster of computing devices, computing systems, or container nodes that may work together to achieve certain specifications or states, as designated in the respective container. In some embodiments, container nodes 228 may be integrated within industrial automation controllers 12 as shown in FIG. 3. That is, container nodes 228 may be implemented by the industrial automation controllers 12, such that they appear as secondary nodes to the primary node in the container orchestration system 222. In this way, the primary node of the container orchestration system 222 may send commands to the container nodes 228 that are also configured to perform applications and operations for the respective industrial equipment.

With this in mind, the container nodes 228 may be integrated with the industrial automation controllers 12, such that they serve as passive-indirect participants, passive-direct participants, or active participants of the container orchestration system 222. As passive-indirect participants, the container nodes 228 may respond to a subset of all of the commands that may be issued by the container orchestration system 222. In this way, the container nodes 228 may support limited container lifecycle features, such as receiving pods, executing the pods, updating a respective filesystem to included software packages for execution by the industrial automation controller 12, and reporting the status of the pods to the primary node of the container orchestration system 222. The limited features implementable by the container nodes 228 that operate in the passive-indirect mode may be limited to commands that the respective industrial automation controller 12 may implement using native commands that map directly to the commands received by the primary node of the container orchestration system 222. Moreover, the container node 228 operating in the passive-indirect mode of operation may not be capable to push the packages or directly control the operation of the industrial automation controller 12 to execute the package. Instead, the industrial automation controller 12 may periodically check the file system of the container node 228 and retrieve the new package at that time for execution.

As passive-direct participants, the container nodes 228 may operate as a node that is part of the cluster of nodes for the container orchestration system 222. As such, the container node 228 may support the full container lifecycle features. That is, container node 228 operating in the passive-direct mode may unpack a container image and push the resultant package to the industrial automation controller 12, such that the industrial automation controller 12 executes the package in response to receiving it from the container node 228. As such, the container orchestration system 222 may have access to a secondary node that may directly implement commands received from the primary node onto the industrial automation controller 12.

In the active participant mode, the container node 228 may include a computing module or system that hosts an operating system (e.g., Linux) that may continuously operate a container host daemon that may participate in the management of container operations. As such, the active participant container node 228 may perform any operations that the primary node of the container orchestration system 222 may perform. By including a container node 228 operating in the OT space, the container orchestration system 222 is capable of extending its management operations into the OT space (e.g., the container node 228 may provision devices in the OT space).

A proxy node 230, which may be an instance of the container node 228 or a different container node 228, may provide bi-directional coordination between the IT space and the OT space, and the like. For instance, the container node 228 operating as the proxy node 230 may intercept orchestration commands and cause industrial automation controller 12 to implement appropriate machine control routines based on the commands. The industrial automation controller 12 may confirm the machine state to the proxy node 230, which may then reply to the primary node of the container orchestration system 222 on behalf of the industrial automation controller 12.

Additionally, the industrial automation controller 12 may share an industrial automation device tree via the proxy node 230. As such, the proxy node 230 may provide the primary node with state data, address data, descriptive metadata, versioning data, certificate data, key information, and other relevant parameters concerning the automation controller 12. Moreover, the proxy node 230 may issue requests targeted to other automation controllers 12 to control other industrial automation devices. For instance, the proxy node 230 may translate and forward commands to a target industrial automation device using one or more OT communication protocols, may translate and receive replies from the industrial automation devices, and the like. As such, the proxy node 230 may perform health checks, provide configuration updates, send firmware patches, execute certificate refreshes, and other OT operations for other industrial automation devices.

Figure 4:
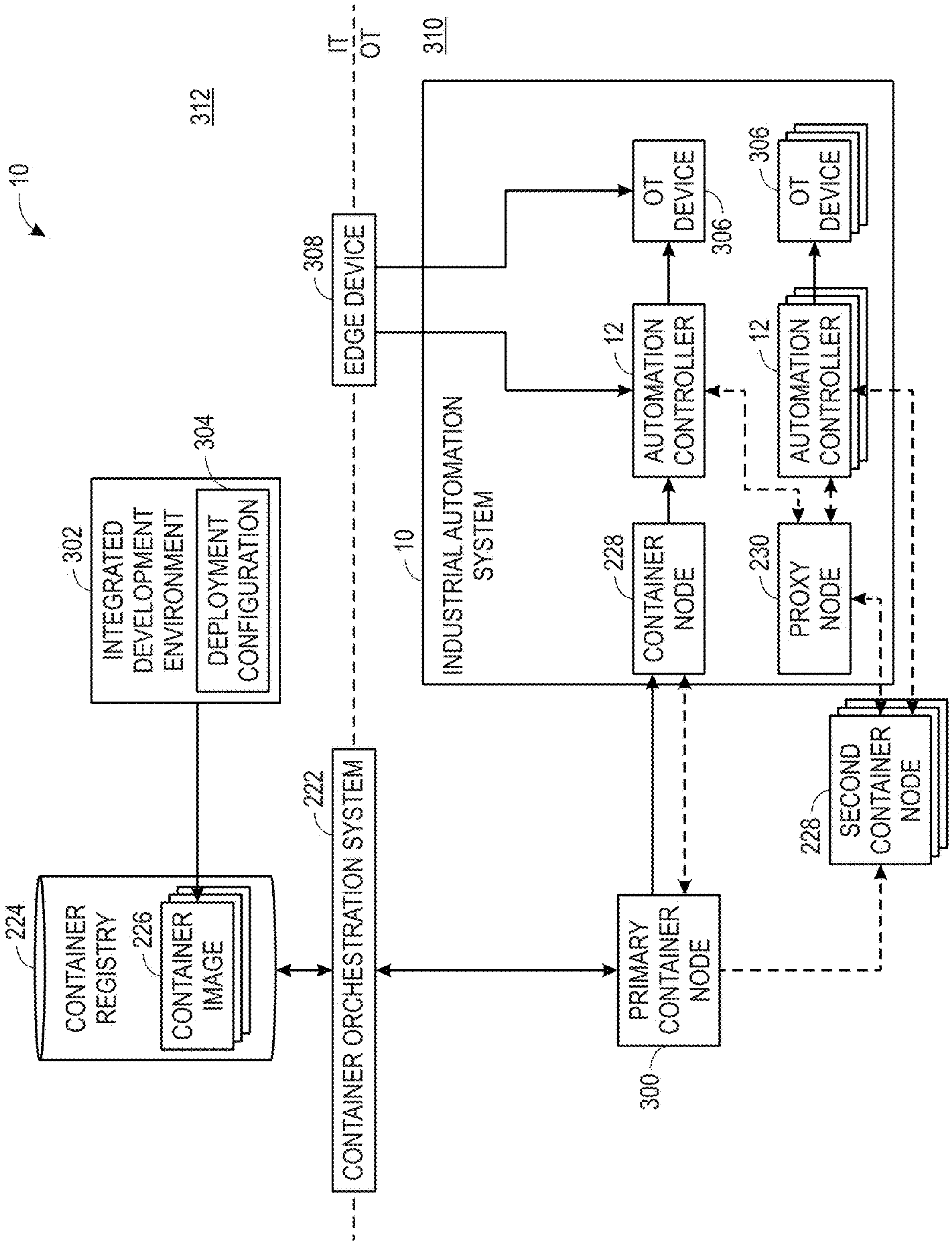
FIG. 4 is a block diagram of an example operational technology (OT) network, including the industrial automation system of FIG. 3, that coordinates with a container orchestration system, in accordance with an embodiment.

FIG. 4 illustrates a block diagram that depicts the relative positions of the container node 228 and the proxy node 230 with respect to the container orchestration system 222. As mentioned above, the container orchestration system 222 may include a collection of nodes that are used to achieve a desired state of one or more containers across multiple nodes. As shown in FIG. 4, the container orchestration system 222 may include a primary node 300 that may execute control plane processes for the container orchestration system 222. The control plane processes may include the processes that enable the container orchestration system 222 to coordinate operations of the container nodes 228 to meet the desired states. As such, the primary container node 300 may execute an application programming interface (API) for the container orchestration system 222, a scheduler component, core resource controllers, and the like. By way of example, the primary container node 300 may coordinate all of the interactions between nodes of the cluster that make up the container orchestration system 222. Indeed, the primary container node 300 may be responsible for deciding the operations that will run on container nodes 228 including scheduling workloads (e.g., containerized applications), managing the workloads' lifecycle, scaling, and upgrades, managing network and storage resources for the workloads, and the like. The primary container node 300 may run an API server to handle requests and status updates received from the container nodes 228.

By way of operation, an integrated development environment (IDE) tool 302 may be used by an operator to develop a deployment configuration file 304. As mentioned above, the deployment configuration file 304 may include details regarding the containers, the pods, constraints for operating the containers/pods, and other information that describe a desired state of the containers specified in the deployment configuration file 304. In some embodiments, the deployment configuration file 304 may be generated in a YAML file, a JSON file, or other suitable file format that is compatible with the container orchestration system 222. After the IDE tool 302 generates the deployment configuration file 304, the IDE tool 302 may transmit the deployment configuration file 304 to the container registry 224, which may store the file along with container images 226 representative of the containers stored in the deployment configuration file 304.

In some embodiments, the primary container node 300 may receive the deployment configuration file 304 via the container registry 224, directly from the IDE tool 302, or the like. The primary container node 300 may use the deployment configuration file 304 to determine a location to gather the container images 226, determine communication protocols to use to establish networking between container nodes 228, determine locations for mounting storage volumes, locations to store logs for the containers, and the like.

Based on the desired state provided in the deployment configuration file 304, the primary container node 300 may deploy containers to the container host nodes 228. That is, the primary container node 300 may schedule the deployment of a container based on constraints (e.g., CPU or memory availability) provided in the deployment configuration file 304. After the containers are operating on the container nodes 228, the primary container node 300 may manage the lifecycle of the containers to ensure that the containers specified by the deployment configuration file 304 are operating according to the specified constraints and the desired state.

Keeping the foregoing in mind, the industrial automation controller 12 may not use an operating system (OS) that is compatible with the container orchestration system 222. That is, the container orchestration system 222 may be configured to operate in the IT space that involves the flow of digital information. In contrast, the industrial automation controller 12 may operate in the OT space that involves managing the operation of physical processes and the machinery used to perform those processes. For example, the OT space may involve communications that are formatted according to OT communication protocols, such as FactoryTalk LiveData, EtherNet/IP, Common Industrial Protocol (CIP), OPC Direct Access (e.g., machine to machine communication protocol for industrial automation developed by the OPC Foundation), OPC Unified Architecture (OPCUA), or any suitable OT communication protocol (e.g. DNP3, Modbus, Profibus, LonWorks, DALI, BACnet, KNX, EnOcean). Because the industrial automation controllers 12 operate in the OT space, the industrial automation controller 12 may not be capable of implementing commands received via the container orchestration system 222.

In certain embodiments, the container node 228 may be programmed or implemented in the industrial automation controller 12 to serve as a node agent that can register the industrial automation controller 12 with the primary container node 300. The node agent may or may not be the same as the proxy node 230 shown in FIG. 3. For example, the industrial automation controller 12 may include a PLC that cannot support an operating system (e.g., Linux) for receiving and/or implementing requested operations issued by the container orchestration system 222. However, the PLC may perform certain operations that may be mapped to certain container events. As such, the container node 228 may include software and/or hardware components that may map certain events or commands received from the primary container node 300 into actions that may be performed by the PLC. After converting the received command into a command interpretable by the PLC, the container node 228 may forward the mapped command to the PLC that may implement the mapped command. As such, the container node 228 may operate as part of the cluster of nodes that make up the container orchestration system 222, while a first industrial automation controller 12 (e.g., PLC) that coordinates the OT operations for a second OT device 306 in the industrial automation system 10. The first industrial automation controller 12 may include a controller, such as a PLC, a high-level controller (HLC), a programmable automation controller (PAC), or any other controller that may monitor, control, and operate an industrial automation device or component (e.g., an OT device 306).

The OT device 306 may correspond to an industrial automation device or component and may include any suitable industrial device that operates in the OT space. As such, the OT device 306 may be involved in adjusting physical processes being implemented via the industrial system 10. In some embodiments, the OT device 306 may include motors, contactors, starters, sensors, drives, relays, protection devices, switchgear, compressors. In addition, the OT device 306 may also be related to various industrial equipment such as mixers, machine conveyors, tanks, skids, specialized original equipment manufacturer machines, and the like. The OT device 306 may also be associated with devices used by the equipment such as scanners, gauges, valves, flow meters, and the like.

In the present embodiments described herein, the industrial automation controller 12 may thus perform actions based on commands received from the container node 228. By mapping certain container lifecycle states into appropriate corresponding actions implementable by the industrial automation controller 12, the container node 228 enables program content for the industrial automation controller 12 to be containerized, published to certain registries, and deployed using the primary container node 300, thereby bridging the gap between the IT-based container orchestration system 222 and the OT-based industrial automation controller 12.

In some embodiments, the container node 228 may operate in an active mode, such that the container node may invoke container orchestration commands for other container nodes 228. For example, a proxy node 230 may operate as a proxy or gateway node that is part of the container orchestration system 222. The proxy node 230 may be implemented in a sidecar computing module that has an operating system (OS) that supports the container host daemon. In another embodiment, the proxy node 230 may be implemented directly on a core of the industrial automation controller 12 that is configured (e.g., partitioned), such that the industrial automation controller 12 may operate using an operating system that allows the container node 228 to execute orchestration commands and serve as part of the container orchestration system 222. In either case, the proxy node 230 may serve as a bi-directional bridge for IT/OT orchestration that enables automation functions to be performed in IT devices based on OT data and in industrial automation controllers 12 and OT devices 306 based on IT data. For instance, the proxy node 230 may acquire industrial automation device tree data, state data for an industrial automation device, descriptive metadata associated with corresponding OT data, versioning data for industrial automation controllers 12 and OT devices 306, certificate/key data for the industrial automation device, and other relevant OT data via OT communication protocols. The proxy node 230 may then translate the OT data into IT data that may be formatted to enable the primary container node 300 to extract relevant data (e.g., machine state data) to perform analysis operations and to ensure that the container orchestration system 222 and the connected industrial automation controllers 12 are operating at the desired state. Based on the results of its scheduling operations, the primary container node 300 may issue supervisory control commands to targeted industrial automation device via the proxy nodes 230, which may translate and forward the translated commands to the respective industrial automation controller 12 via the appropriate OT communication protocol.

In addition, the proxy node 230 may also perform certain supervisory operations based on its analysis of the machine state data of the respective industrial automation controller 12. As a result of its analysis, the proxy node 230 may issue commands and/or pods to other nodes that are part of the container orchestration system 222. For example, the proxy node 230 may send instructions or pods to other secondary container nodes 228 that may be part of the container orchestration system 222. The secondary container nodes 228 may corresponds to other container nodes 228 that are communicatively coupled to other industrial automation controllers 12 for controlling other OT devices 306. In this way, the proxy node 230 may translate or forward commands directly to other industrial automation controllers 12 via certain OT communication protocols or indirectly via the other secondary container nodes 228 associated with the other industrial automation controllers 12. In addition, the proxy node 230 may receive replies from the industrial automation controllers 12 via the OT communication protocol and translate the replies, such that the nodes in the container orchestration system 222 may interpret the replies. In this way, the container orchestration system 222 may effectively perform health checks, send configuration updates, provide firmware patches, execute certificate refreshes, and provide other services to OT devices 306 in a coordinated fashion. That is, the proxy node 230 may enable the container orchestration system to coordinate the activities of multiple industrial automation controllers 12 to achieve a collection of desired machine states for the connected OT devices 306.

As shown in FIG. 4, the industrial automation system 10 may include one or more edge devices 308 that interact with OT assets (e.g., industrial automation controllers 12, OT devices 306, etc.) within the industrial automation system 10. As used herein, an edge device 308 is a device within the industrial automation system 10 that controls data flow within the industrial automation system 10 (e.g., an OT network 310) as well as between the industrial automation system 10 (e.g., the OT network 310) and an IT network 312. For example, the edge device 308 may be a router, a switch, or the like. In certain embodiments, the edge device 308 may receive data from the OT network 310 that may include, for example, an enterprise system, a server device, a plant management system, or the like. The enterprise system may include software and/or hardware components that support business processes, information flows, reporting, data analytics, and the like for an enterprise. The server device may manage communication between the components of the industrial automation system 10. The plant management system may include any suitable management computing system that receives data from a number of automation controllers 12 and/or industrial automation systems 10. As such, the plant management system may track operations of one or more facilities and one or more locations. In addition, the plant management system may issue control commands to the components of the industrial automation system 10.

Asset management in OT environments, such as the OT network of FIG. 4 is tedious, resource intensive, and prone to human error. Typically, to determine what assets (e.g., industrial automation controllers 12, OT devices 306, etc.) an enterprise has, a person walks through a facility and physically identifies assets 306. The person may have a design file, a parts list, an inventory, or some other source of information about assets operated by the enterprise at some point in time, but physical systems are frequently updated and/or modified without updating corresponding design files, parts lists, inventories, etc., resulting in inconsistencies between the actual collection of assets being operated and the corresponding design files, parts lists, inventories, etc. To identify characteristics of the asset 306, such as make, model, serial number, etc., the person may locate a label on the physical device and read information from the label. To identify other assets 306 to which the asset 306 is connected, the person may physically identify cables connected to the asset 306 and trace the cables to determine the other assets 306 to which the asset 306 is connected. Some relevant information about the asset 306, such as information that may change over the life of the asset, may not be listed on the label of the asset. To obtain this information, the person may utilize a user interface of the asset 306, or some intermediary device, such as a human machine interface (HMI), a mobile device, a tablet, and so forth to physically or wirelessly connect to the asset 306, or another asset 306 communicatively coupled to the asset 306, and request or retrieve information about the asset 306, such as firmware version being run by the asset 306, software being run on the asset 306, configuration, operational state, log data, operational parameters, logic being run, available computing resources, processor/memory utilization, and so forth. Once information about the asset 306 has been collected, the information may be provided to a table, a database, a file, etc. via manual entry, importation of a comma separated values (CSV) file, etc. Further, to update an asset 306 (e.g., update firmware/software, install new software, update configuration, update operational state, change operational parameters, update logic, etc.), the person utilizes a user interface of the asset 306, or some intermediary device to physically or wirelessly connect to the asset 306, or another asset communicatively coupled to the asset 306, and then pushes the update to the asset 306. Accordingly, collecting, importing, and maintaining information about assets 306 within an OT environment, and updating assets 306 within the OT environment is a manual process that is tedious, resource intensive, and prone to error.

Figure 5:
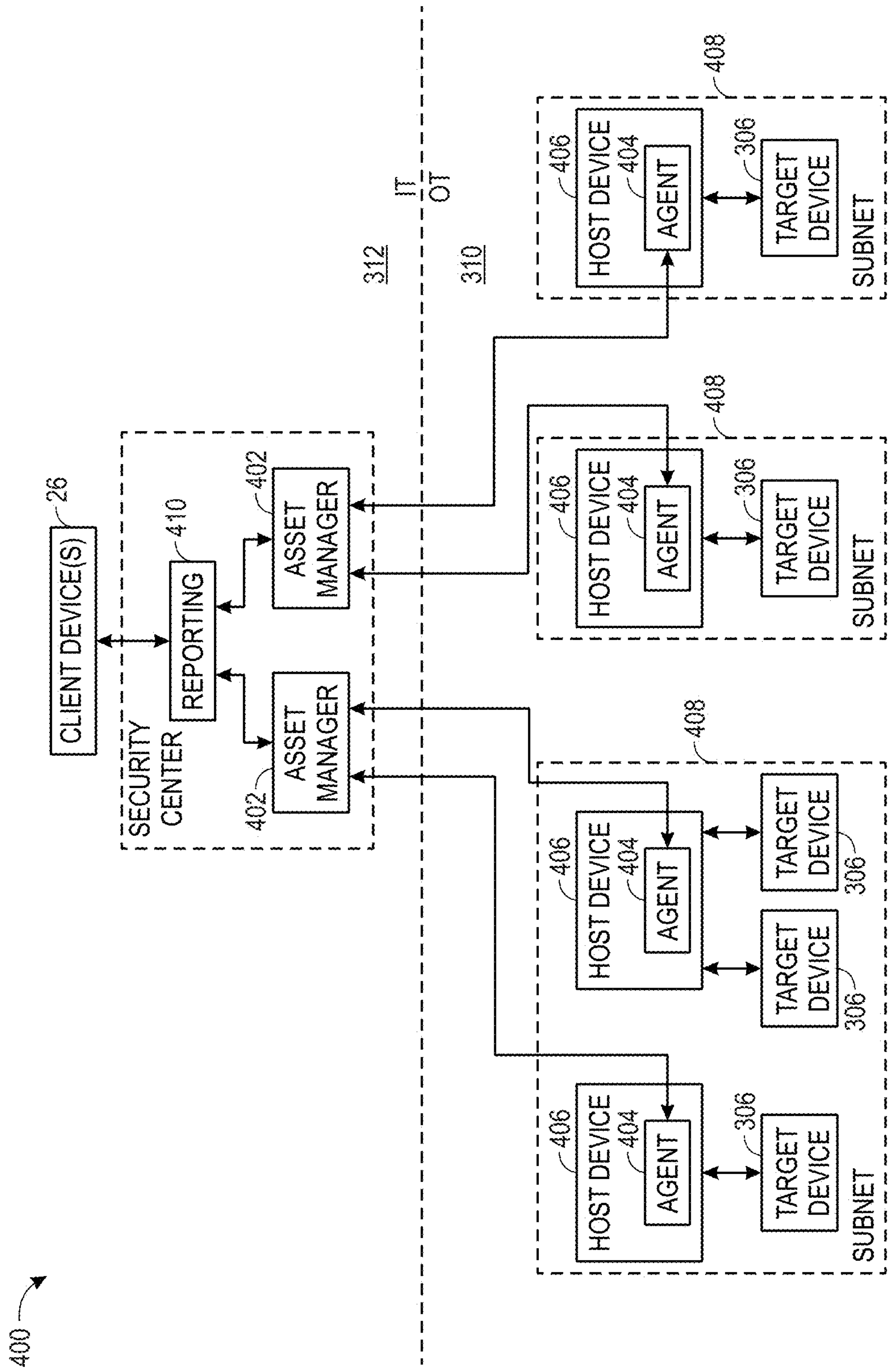
FIG. 5 illustrates an architecture for asset management in an OT environment, such as the OT network of FIG. 4, in accordance with an embodiment.

Accordingly, FIG. 5 illustrates an architecture 400 for asset management in an OT environment (e.g., OT network 310). As shown, one or more asset managers 402 run on servers in an IT network 312. The asset managers 402 deploy and interface one or more agents 404 (e.g., endpoint management agents), which run on respective host devices 406 disposed within subnets 408 of the OT network 310. Though not shown in FIG. 5, in some embodiments, one or more agents 404 may run on the same server as the asset manager 402. The agents 404 interface with, and receive data from, one or more target devices 306 (e.g., OT devices 306), and transmit data to the asset manager 402, which maintains a table and/or a database populated with information about the assets 306. A reporting application 410, analyzes data stored in the table and/or a database maintained by the asset managers 402 and generates visualizations accessible via one or more client devices 26. The visualizations may communicate information about the target devices 306 in the OT network 310, vulnerabilities experienced by the OT network 310, risk assessments of the OT network 310, recommended actions for better securing the OT network 310, and so forth.

The asset managers 402 run on respective servers. Typically, if an enterprise runs multiple asset managers 402, the asset managers 402 run or different servers (e.g., a single server typically does not run two asset managers 402). The asset managers 402 may run on on-premises ("on-prem") servers that are on the IT network 312, on remote servers that are remote from the IT network 312, but accessible via the IT network 312, on a cloud sever, or on some other processor-based computing device. Typically, the asset managers 402 operate on Linux servers, but in some embodiments, the asset managers 402 may run on Windows servers, or servers that are operating system agnostic. In some embodiments, the asset managers 402 may also run in containers or on virtual machines. Though the embodiment shown in FIG. 5 includes two asset managers 402, it should be understood that embodiments are envisaged in which an enterprise operates a different number of asset managers 402. Accordingly, an enterprise by operate a single asset manager 402 or multiple asset managers 402 for an OT network 310.

The asset managers 402 may receive an initial set of data identifying one or more devices on the OT network 310 that may include host devices 406, target devices 306, or other assets on the OT network 310. The initial data set may be provided manually by an operator, bulk data entry or bulk data import (e.g., CSV files), an inventory or parts list, a data set prepared by a third party (e.g., based on discovery, a network scan, a design file, etc.). Based on the assets identified in the initial data set, the asset manager 402 may identify one or more host devices 406 (e.g., computing devices running Linux or Windows) within a subnet 408 of the OT network 310 and deploy an agent 404 to the host device 406. Deployment of the agent 404 may include, for example, transmitting a file or a package including one or more portions of code for execution by the host device 406. Accordingly, once executed, the agent 404 may run as an application on the host device 406 or within a container running on a compute surface of the host device 406. Because the agent 404 is communicatively coupled to the asset manager 402, the agent 404 even works in subnets 408 that only allow data flow in a single direction. In some embodiments, the agent 404 may be deployed to a host device 406 in response to a determination that a target device 306 is otherwise inaccessible to the asset manager 402. For example, if the asset manager 402 encounters a firewall, the asset manager 402 may deploy an agent 404 to the host device 406 to establish an independent network connection. The agent 404 may monitor communications that traverse via the host device 406 and report the communications to the asset manager 402.

Once the agent 404 has been deployed to a host device 406, the asset manager 402 may identify one or more target devices 306 on the subnet 408. The target devices 306 may be identified based on the initial data set described above, based on a discovery operation performed by the agent, or a combination thereof. For example, to perform a discovery operation, the agent 404 may query the host device's 406 table of network connections to identify one or more target devices 306 on the subnet 408 that are in communication with the host device 406. Further, the agent 404 may query the host device's 406 address resolution protocol (ARP) cache, which maps device IP addresses to MAC addresses, to identify devices on the subnet 408. In some embodiments, the agent 404 may also be configured to perform a ping sweep of the network to identify devices that respond and/or send OT-specific protocol commands to devices on the subnet 408 to provide "I exist" assertions from devices on the subnet 408. As the agent 404 collects information about target devices 306 and/or other host devices 406 on the subnet 408, the agent 404 periodically relays collected information to the asset manager 402. The asset manager 402 may then populate its tables and/or databases of assets on the OT network 310 based on the received data. As additional host devices 406 are discovered on the subnet 408, new agents 404 may be deployed to the new host devices 406. During discovery, as agents 404 are deployed, target devices 306 may become host devices 406, and/or particular devices may be both host devices 406 and target devices 306. Accordingly, as shown in FIG. 5, a subnet may include multiple host devices 406 running agents 404 and individual agents 404 may be in communication with multiple target devices 306. This discovery process may continue for some set number of iterations, for some set amount of time, until some period of time or number of iterations passes without a new device being discovered, etc.

Once target devices 306 have been discovered, the asset manager 402 identifies one or more drivers that correspond to the discovered devices and transmits the identified drivers to the agent 404 on the subnet 408 by which the asset manager 402 will interface with the target device 306. In some embodiments, drivers may be selected using a machine learning model that identifies a pattern of devices that employed certain drivers via the respective agents 404. That is, the asset manager 402 may collect data related to the drivers used by agents 404 over time for various types of devices, such that the model may provide insights into the expected drivers that should be included for each type of asset. In this way, the agent may quickly obtain the necessary drivers to establish a connection with the respective target device 306. By only providing relevant drivers to the agent 404, memory utilization is reduced and the software suite is kept compact. The drivers may include, for example, a file or a package including one or more portions of code that give the agent 404 the capability to interface with the target device 306 and/or perform various functions with or related to the target device 306. This may include, for example, requesting and/or retrieving data (e.g., identifying data, characteristic data, configuration data, software/firmware data, operational data, network data, log data, etc.) from the target device 306, providing a command to the target device 306 to perform some action, updating the firmware of the target device 306, updating software of the target device 306, patching the target device 306, installing new software on the target device 306, and so forth.

Once drivers have been received by the asset manager 402 and installed on the host device 406 by the agent 404, the asset manager 402 may transmit commands or other instructions to the agent 404 to perform various tasks on or with the target devices 306. As previously described, the tasks may include requesting and/or retrieving data (e.g., identifying data, characteristic data, configuration data, software/firmware data, operational data, network data, log data, etc.) from the target device 306, providing a command to the target device 306 to perform some action, updating the firmware of the target device 306, updating software of the target device 306, patching the target device 306, installing new software on the target device 306, and so forth. If multiple agents 404 are deployed to host devices within a subnet 408, the asset manager 402 may select a particular agent 404 to perform certain tasks. The asset manager 402 may select the agent 404 with the lowest latency perform the tasks or use some other selection algorithm. The asset manager 402 may also deploy multiple agents 404 in a strategic matter to balance the presence of the agents 404 across the subnet 408. The identification of the locations (e.g., host devices 406) for the agents 404 may be determined using a number of network balancing considerations. Indeed, as host devices 406 and target devices 306 are added to the subnet 408, the asset manager 402 may dynamically redistribute the agents 404 to account for the added devices. During or following performance of the task, the agent 404 may collect data from performance and/or completion of the task and transmit the data to the asset manager 402. The asset manager 402 subsequently updates its tables and/or database based on the received data. In some embodiments, the asset manager 402 may perform some post-processing or analysis of the received data.

The reporting application 410 may share a server with one or more of the asset managers 402, or may have its own server (e.g., an on-prem server on the IT network 312, a remote server that is remote from the IT network 312, but accessible via the IT network 312, a cloud server, etc.) or run on some other processor-based computing device. The reporting application 410 may receive or retrieve data from the asset managers 402 and process of the data, and generate visualizations, accessible via one or more client devices 26, that represent various aspects of the OT network 310. For example, the visualizations may represent information about one or more target devices 306, such as available firmware updates and/or patches, vulnerabilities experienced by the target device 306, indications of how long vulnerabilities have been experienced by the target device 306, a risk associated with one or more vulnerabilities experienced by the target device 306, recommendations for securing the target device 306, characteristics of the target device 306, etc. Further, the visualizations may represent information about a particular subnet 408, and/or the OT network 310, such as vulnerabilities experienced by the subnet 408, and/or the OT network 310, indications of how long vulnerabilities have been experienced by the subnet 408, and/or the OT network 310, a risk associated with one or more vulnerabilities experienced by the subnet 408, and/or the OT network 310, recommendations for securing the subnet 408, and/or the OT network 310, characteristics of the subnet 408, and/or the OT network 310, subnet 408 and/or OT network 310 topology, and so forth. In some embodiments, the reporting application 410 may be configured to correlate information gathered by the asset managers 402 (e.g., via the agents 404) with information gathered via integration with one or more third party systems/services and generate visualizations (e.g., backup status, presence of endpoint security tools, status of endpoint security tools, and so forth.

Based on the visualizations, a user may take action, independently or via the client device 26 and the asset manager(s) 402 to implement recommended actions, provide instructions to update software/firmware, address vulnerabilities, and so forth. In embodiments in which action is taken via the asset manager(s) 402, inputs provided via the client device 26 may become commands provided from asset managers 402 to agents 404 defining tasks to be performed on one or more target devices 306, which may result in data being generated or collected and provided by the agent 404 to the asset manager 402.

Figure 6:
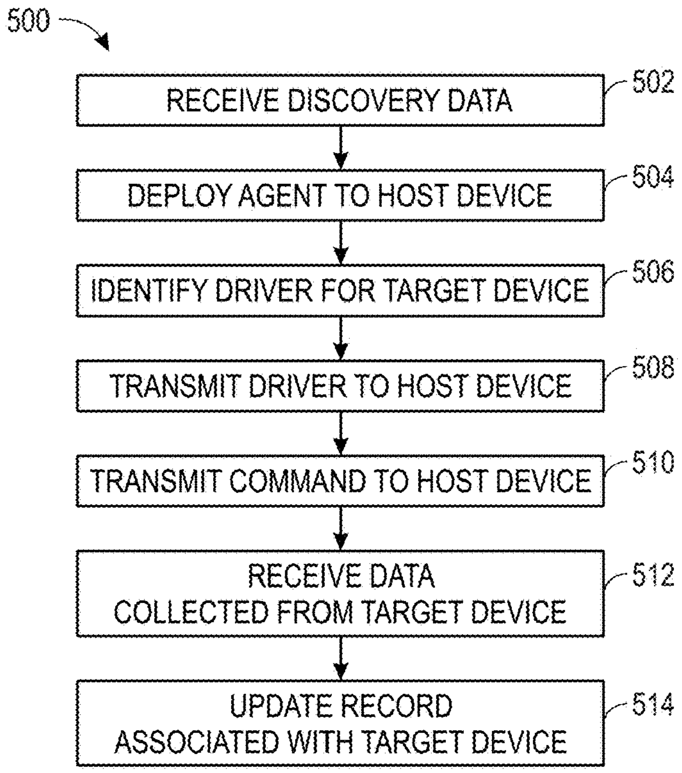
FIG. 6 is a flow chart of a process for performing asset management in the OT environment via an asset manager, in accordance with an embodiment.

FIG. 6 is a flow chart of a process 500 for performing asset management in an OT environment via an asset manager. At 502, discovery data is received that identifies one or more assets (e.g., OT devices) on an OT network, such as within a subnet of the OT network. The discovery data may be manually entered by an operator, provided via bulk data entry or bulk data import (e.g., via one or more CSV files), an inventory or parts list, a data set prepared by a third party (e.g., based on discovery, a network scan, a design file, etc.), and so forth. In some embodiments, the data may be data collected by a previously deployed agent during a discovery process. For example, the previously deployed agent may query the host device's table of network connections to identify one or more target devices on a subnet that are in communication with the host device, query the host device's ARP cache, which maps device IP addresses to MAC addresses, to identify devices on the subnet, perform a ping sweep of the network to identify devices that respond and/or send OT-specific protocol commands to devices on the subnet to provide "I exist" assertions from devices on the subnet, and so forth.

At 504, the process 500 deploys an agent to a host device identified in the discovery data at 502. The deployment may include, for example, transmitting a file or a package including one or more portions of code that define the agent for execution by the host device. Once installed on the host device, the agent 404 may run as an application on the host device 406, within a container running on a compute surface of the host device 406, within a Python runtime environment (allowing the agent 404 to use shared libraries and reduce memory usage), and so forth.

At 506, the process 500 identifies a driver for a target device. Specifically, based on the discovery data received at 502, the process 500 identifies one or more target devices on the subnet to which the host was deployed and identifies one or more drivers that correspond to the identified target device. The drivers may include, for example, a file or a package including one or more portions of code that give the agent the capability to interface with the target device and/or perform various functions with or related to the target device, such as, requesting and/or retrieving data (e.g., identifying data, characteristic data, configuration data, software/firmware data, operational data, network data, log data, etc.) from the target device, providing a command to the target device to perform some action, updating the firmware of the target device, updating software of the target device, patching the target device, installing new software on the target device, and so forth. At 508, the drivers are transmitted to the host device on which the agent is installed. In some embodiments, all of the drivers corresponding to the target device may be transmitted to the host device, whereas in other embodiments, only the drivers corresponding to the target device that are associated with particular commands and/or tasks are transmitted to the host device.

At 510, after the drivers have been received by the host device, a command to perform some action using the drivers is transmitted to the host device for performance by the agent. As previously described, the command may include a command to request and/or retrieve data (e.g., identifying data, characteristic data, configuration data, software/firmware data, operational data, network data, log data, etc.) from the target device, provide a command to the target device to perform some action, update the firmware of the target device, update software of the target device, patch the target device, install new software on the target device, and so forth. During or following performance of the task, the agent may collect data from performance and/or completion of the task. Accordingly, at 512, the process 500 receives, from the host device, the data collected from the target device during performance of the task. At 514, the process 500 updates one or more records associated with the target device in the tables and/or database based on the received data.

Figure 7:
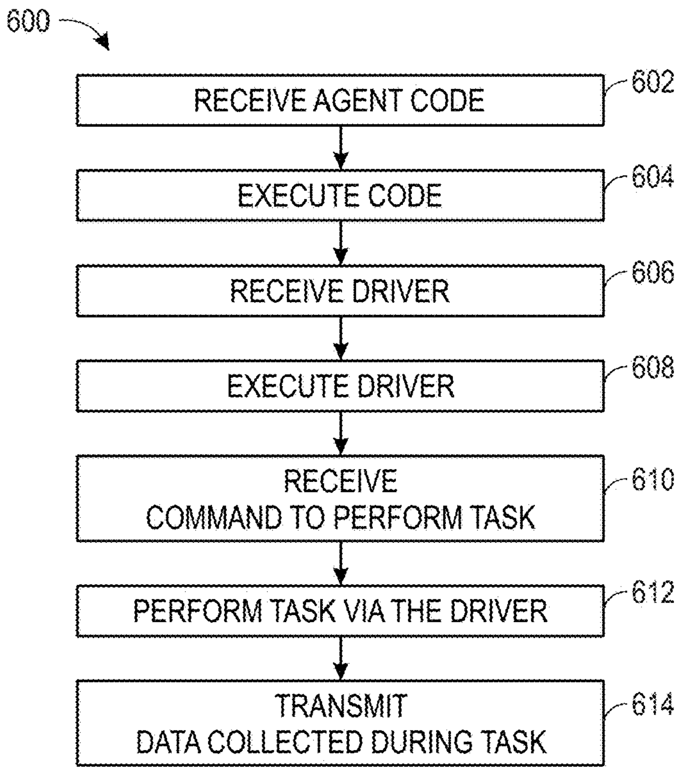
FIG. 7 is a flow chart of a process for performing asset management in the OT environment via an agent installed on a host device, in accordance with an embodiment.

FIG. 7 is a flow chart of a process 600 for performing asset management in an OT environment via an agent installed on a host device. At 602, the process 600 receives code (e.g., a file or a package) defining the agent. At 604, process 600 executes the code to install the agent on the host device.

At 606, the process 600 receives a driver. As previously described the driver may be selected based on the identity of a target device within the subnet of the OT network, and/or one or more capabilities for the agent to have with respect to the target device. The drivers may include, for example, a file or a package including one or more portions of code that give the agent the capability to interface with the target device and/or perform various functions with or related to the target device, such as, requesting and/or retrieving data (e.g., identifying data, characteristic data, configuration data, software/firmware data, operational data, network data, log data, etc.) from the target device, providing a command to the target device to perform some action, updating the firmware of the target device, updating software of the target device, patching the target device, installing new software on the target device, and so forth. At 608, the process 600 executes the driver. At 610, the process 600 receives a command to perform a task and then performs the task at 612 via the driver. The task may include requesting and/or retrieving data (e.g., identifying data, characteristic data, configuration data, software/firmware data, operational data, network data, log data, etc.) from the target device, providing a command to the target device to perform some action, updating the firmware of the target device, updating software of the target device, patching the target device, installing new software on the target device, and so forth. During or following performance of the task, the process 600 may collect and/or receive data from performance and/or completion of the task and transmit the data for analysis at 614.

The present disclosure is directed to a system for performing asset management via an OT device agent. One or more asset manager applications receive or access discovery data regarding assets on an OT network and deploy agents to known host devices within the OT network. The asset manager application maintains a table or database of assets on the OT network, wherein each asset is represented as a record. The asset manager application identifies drivers based on known target devices on the OT network that allow the agents to interface with the target devices. The asset manager application provides the drivers to the agents and then sends commands to perform tasks with the target devices via the drivers. The tasks may include, for example, retrieving/requesting data from target devices, providing a command to the target device to perform some action, updating the firmware of the target device, updating software of the target device, patching the target device, installing new software on the target device, and so forth. Performance of the task may result in data, which is collected by the agent and transmitted to the asset management application. The asset manager application updates the table or database based on the received data. A reporting application, analyzes data stored in the table and/or database maintained by the one or more asset manager applications and generates visualizations accessible via one or more client devices that communicate information about the target devices in the OT network, vulnerabilities experienced by the OT network, risk assessments of the OT network, recommended actions for better securing the OT network, and so forth. Technical effects of implementing the disclosed subject matter is more efficient and streamlined asset management of an OT network that reduces use of human, computing, and financial resources, and also reduces errors resulting from data being transposed by humans.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A method, comprising:

receiving, from a server, code configured to cause processing circuitry to operate as an endpoint management agent on an operational technology (OT) network;

executing the code;

receiving, from the server, a driver associated with a target device on the OT network wherein the driver enables the endpoint management agent to interface with the target device;

executing the driver;

receiving, from the server, a command to perform a task with the target device via the driver;

performing the task via the driver, wherein the task comprises collecting data from the target device; and transmitting, to the server, the data collected from the target device during performance of the task.

2. The method of claim 1, wherein the target device is on a subnet of the OT network.

3. The method of claim 1, comprising:

receiving, from the server, an additional driver associated with an additional target device on the OT network wherein the additional driver enables the endpoint management agent to interface with the additional target device;

executing the additional driver;

receiving, from the server, an additional command to perform an additional task with the additional target device via the additional driver;

performing the additional task via the additional driver, wherein the additional task comprises collecting additional data from the additional target device; and transmitting, to the server, the additional data collected from the additional target device during performance of the additional task.

4. The method of claim 1, wherein the processing circuitry runs a Windows or Linux-based operating system.

5. The method of claim 1, wherein the endpoint management agent runs in a container that runs on the processing circuitry.

6. The method of claim 1, wherein the data comprises identifying data, characteristic data, configuration data, software data, firmware data, operational data, network data, log data, or any combination thereof.

7. The method of claim 1, wherein the task comprises updating firmware of the target device, updating software of the target device, patching the target device, installing new software on the target device, or any combination thereof.

8. A system, comprising:

processing circuitry; and a memory, accessible by the processing circuitry, and storing instructions that, when executed by the processing circuitry, cause the processing circuitry to perform operations comprising:

receiving, from a server, code configured to cause the processing circuitry to operate as an endpoint management agent on an operational technology (OT) network;

executing the code;

receiving, from the server, a driver associated with a target device on the OT network wherein the driver enables the endpoint management agent to interface with the target device;

executing the driver;

receiving, from the server, a command to perform a task with the target device via the driver;

performing the task via the driver, wherein the task comprises collecting data from the target device; and transmitting, to the server, the data collected from the target device during performance of the task.

9. The system of claim 8, wherein the target device is on a subnet of the OT network.

10. The system of claim 8, wherein the operations comprise:

receiving, from the server, an additional driver associated with an additional target device on the OT network wherein the additional driver enables the endpoint management agent to interface with the additional target device;

executing the additional driver;

receiving, from the server, an additional command to perform an additional task with the additional target device via the additional driver;

performing the additional task via the additional driver, wherein the additional task comprises collecting additional data from the additional target device; and transmitting, to the server, the additional data collected from the additional target device during performance of the additional task.

11. The system of claim 8, wherein the endpoint management agent runs in a container that runs on the processing circuitry.

12. The system of claim 8, wherein the data comprises identifying data, characteristic data, configuration data, software data, firmware data, operational data, network data, log data, or any combination thereof.

13. The system of claim 8, wherein the task comprises updating firmware of the target device, updating software of the target device, patching the target device, installing new software on the target device, or any combination thereof.

14. A non-transitory computer readable medium storing instructions that, when executed by processing circuitry, cause the processing circuitry to perform operations comprising:

receiving, from a server, code configured to cause the processing circuitry to operate as an endpoint management agent on an operational technology (OT) network;

executing the code;

receiving, from the server, a driver associated with a target device on the OT network wherein the driver enables the endpoint management agent to interface with the target device;

executing the driver;

receiving, from the server, a command to perform a task with the target device via the driver;

performing the task via the driver, wherein the task comprises collecting data from the target device; and transmitting, to the server, the data collected from the target device during performance of the task.

15. The non-transitory computer readable medium of claim 14, wherein the target device is on a subnet of the OT network.

16. The non-transitory computer readable medium of claim 14, wherein the operations comprise:

receiving, from the server, an additional driver associated with an additional target device on the OT network wherein the additional driver enables the endpoint management agent to interface with the additional target device;

executing the additional driver;

receiving, from the server, an additional command to perform an additional task with the additional target device via the additional driver;

performing the additional task via the additional driver, wherein the additional task comprises collecting additional data from the additional target device; and transmitting, to the server, the additional data collected from the additional target device during performance of the additional task.

17. The non-transitory computer readable medium of claim 14, wherein the processing circuitry runs a Windows or Linux-based operating system.

18. The non-transitory computer readable medium of claim 14, wherein the endpoint management agent runs in a container that runs on the processing circuitry.

19. The non-transitory computer readable medium of claim 14, wherein the data comprises identifying data, characteristic data, configuration data, software data, firmware data, operational data, network data, log data, or any combination thereof.

20. The non-transitory computer readable medium of claim 14, wherein the task comprises updating firmware of the target device, updating software of the target device, patching the target device, installing new software on the target device, or any combination thereof.

* * * * *